(12) United States Patent
Lin et al.

(10) Patent No.: US 8,665,154 B2
(45) Date of Patent: Mar. 4, 2014

(54) MODELING AND LOCATION INFERENCE BASED ON ORDERED BEACON SETS

(75) Inventors: Jyh-Han Lin, Mercer Island, WA (US); Pradipta Kumar Basu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 13/106,874

(22) Filed: May 13, 2011

(65) Prior Publication Data
US 2012/0286997 A1    Nov. 15, 2012

(51) Int. Cl.
*G01S 3/02* (2006.01)
(52) U.S. Cl.
USPC ........................................................ 342/451
(58) Field of Classification Search
USPC ........................................................ 342/451
See application file for complete search history.

(56) References Cited

U.S. PATENT DOCUMENTS

| | | | |
|---|---|---|---|
| 7,038,584 B2 | 5/2006 | Carter | |
| 7,299,256 B2 | 11/2007 | Pradhan et al. | |
| 7,414,988 B2 | 8/2008 | Jones et al. | |
| 7,751,829 B2 | 7/2010 | Masuoka et al. | |
| 2008/0161011 A1* | 7/2008 | Babin et al. ................. | 455/456.1 |
| 2008/0274752 A1 | 11/2008 | Houri | |
| 2010/0109864 A1* | 5/2010 | Haartsen et al. ......... | 340/539.13 |
| 2010/0148954 A1* | 6/2010 | Bobier ...................... | 340/539.11 |
| 2011/0256871 A1* | 10/2011 | Cooper et al. ............... | 455/436 |
| 2011/0312330 A1* | 12/2011 | Sadek et al. ............... | 455/452.2 |

OTHER PUBLICATIONS

Qin, et al., "Node Localization with a Mobile Beacon based on Ant Colony Algorithm in Wireless Sensor Networks", Retrieved at <<http://ieeexplore.ieee.org/stamp/stamp.jsp?tp=&arnumber=5471578>>, In the Proceedings of international Conference on Communications and Mobile Computing, Apr. 12-14, 2010, pp. 303-307.
Kim, et al., "Discovering Semantically Meaningful Places from Pervasive RF-Beacons", Retrieved at <<http://ils.intel-research.net/uploads/papers/kim2009discovering.pdf>>, In the Proceedings of the 11th international conference on Ubiquitous computing, Sep. 30-Oct. 3, 2009, pp. 10.
Behnke, et al., "Strategies to overcome Border Area Effects of Coarse Grained Localization", Retrieved at <<—2009 http://ieeexplore.ieee.org/stamp/stamp.jsp?tp=&arnumber=4907810>>, In the Proceedings of the 6th Workshop on Positioning, Navigation and Communication, Mar. 2009, pp. 95-102.
Cheng, et al., "Accuracy Characterization for Metropolitan-Scale WiFi Localization", Retrieved at <<http://www.placelab.org/publications/pubs/IRS-TR-05-003.pdf>>, In the Proceedings of the 3rd international conference on Mobile systems, applications, and services, Jan. 2005, pp. 13.

* cited by examiner

*Primary Examiner* — Harry Liu
(74) *Attorney, Agent, or Firm* — Aaron Chatterjee; Andrew Sanders; Micky Minhas (57) ABSTRACT

Embodiments order observed beacons based on relative signal strength to create a correspondence between beacon sets and positions. A computing device such as a mobile device provides a positioned observation including a plurality of observed beacons and a position of the mobile device during observation. The observed beacons are ordered based on quality indicators such as signal strength relative to each other. A set of the beacons are selected based on the ordering (e.g., the beacons with the strongest signal strength are selected in order). The position of the observing mobile device is associated with the beacon set to enable location inference for other devices providing observations including the same beacon set.

20 Claims, 7 Drawing Sheets

MODELING AND LOCATION INFERENCE BASED ON ORDERED BEACON SETS

BACKGROUND

Some existing location services provide position information to requesting computing devices based on crowd-sourced data. In such systems, the requesting computing devices provide a set of observed beacons and the location services return an approximate position of the requesting computing devices based on the set of observed beacons.

While some of the location services consider the signal strengths detected by the computing device when observing the beacons, the accuracy of the determined position suffers due to the large variations in detected signal strengths. The signal strengths may vary based on location and environment. In the example of mobile devices, the signal strength varies due to interference and multipath on the radio channel, even for mobile devices at the same location. The signal strength may also vary based on orientation of the mobile devices and the presence of any surrounding objects (e.g., including human bodies). Further, signal strength values may differ based on different mobile device models and even among different mobile devices of the same model.

SUMMARY

Embodiments of the disclosure infer location of a computing device using a beacon set selected based on quality indicators such as relative signal strength. A positioned observation associated with a computing device is accessed. The positioned observation has associated therewith beacons observed by the computing device, one or more quality indicators for each of the observed beacons, and a position of the computing device. A plurality of the beacons is selected based on the quality indicators relative among the beacons. The position is associated with the selected plurality of the beacons. The selected plurality of the beacons and associated position are stored in a memory area. In some embodiments, the operations are performed by a computing device or a cloud service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable modeling and location inference based on quality indicators 316 associated with beacons 202 observed by computing devices (e.g., mobile computing devices 102). In some embodiments, the observed beacons 202 are ordered into sets 320 based on relative signal strengths to spatially partitioned regions. A position is associated with each region (e.g., a centroid of the region) based on the observed beacons having the same relative signal strengths, and the ordered beacon set 320 may be referred to as a virtual beacon. The virtual beacon corresponds to a spatial region where the relative signal strengths of the beacons 202 in the ordered beacon set 320 are the same. Based on the correspondence between the ordered beacon sets 320 and the associated positions 414, locations of computing devices may be determined by ordering beacons 202 observed by a requesting computing device to find a match with the ordered beacon sets 320 previously identified.

An example is next described in which mobile computing devices 102 provide three observations $O_1$, $O_2$, $O_3$ involving five beacons $B_1$, $B_2$, $B_3$, $B_4$, $B_5$ observed with different signal strength values S. For $O_1$, the observed beacons and signal strengths include $B_1(S_a)$, $B_2(S_b)$, $B_3(S_c)$, $B_4(S_d)$, $B_5(S_e)$, where $S_b > S_d > S_a > S_c > S_e$ is the relative signal strength order. If the beacons are ordered based on relative signal strengths and the top three beacons are selected, $O_1$ then corresponds to a virtual beacon $V_1 = (B_2, B_4, B_1)$.

For $O_2$, the observed beacons and signal strengths include $B_1(S_w)$, $B_2(S_x)$, $B_3(S_y)$, $B_4(S_z)$, where $S_x > S_z > S_w > S_y$ is the relative signal strength order. If the beacons are ordered based on relative signal strengths and the top three beacons are selected, then $O_2$ corresponds to virtual beacon $V_1 = (B_2, B_4, B_1)$, the same as $O_1$.

For $O_3$, the observed beacons and signal strengths include $B_1(S_p)$, $B_2(S_q)$, $B_3(S_r)$, $B_4(S_s)$, $B_5(S_t)$, where $S_q > S_p > S_s > S_r > S_t$ is the relative signal strength order. If the beacons are ordered based on relative signal strengths and the top three beacons are selected, then $O_3$ corresponds to virtual beacon $V_2 = (B_2, B_1, B_4)$. Thus, even though $V_1$ and $V_2$ are virtual beacons with the same set of beacons, they are different because of the relative signal strength order.

Figure 1:
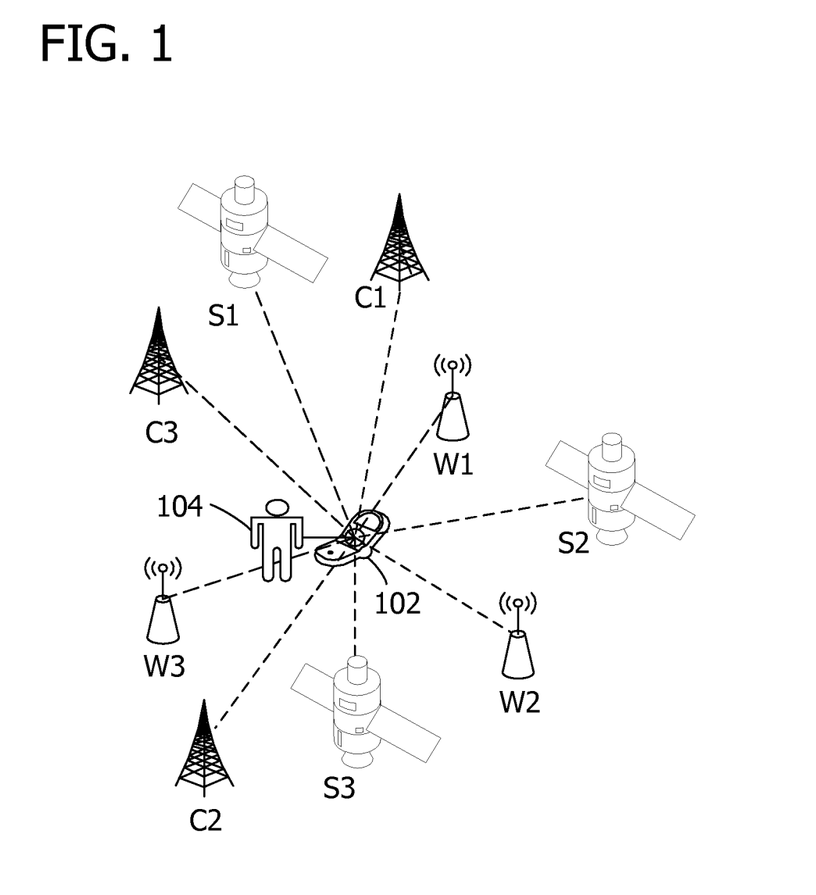
FIG. 1 is an exemplary block diagram illustrating a mobile computing device detecting one or more nearby beacons.

Referring next to FIG. 1, an exemplary block diagram illustrates a mobile computing device 102 of a user 104 detecting one or more nearby beacons 202. The mobile computing device 102 (e.g., a mobile telephone) detects or observes one or more beacons 202 including cellular towers (or sectors if directional antennas are employed), wireless fidelity (Wi-Fi) access points, satellites, or other wireless access points (WAPs) via one or more location sensors 304 of the mobile computing device 102.

The beacons 202 observed or otherwise detected by the mobile computing device 102 in approximately the same location at approximately the same time represent a beacon fingerprint 312. The beacon fingerprint 312 may also include other attributes or descriptions of the detection or connection with the beacons 202 such as one or more quality indicators 316 collected by the mobile computing device 102. Exemplary quality indicators 316 describe signal quality and include, for example, a signal strength 318 such as an absolute signal strength and a signal-to-noise ratio. Signal strength 318 may be represented as a received signal strength indicator (RSSI) value. In embodiments in which the mobile computing device 102 is equipped with a global positioning system (GPS) receiver, exemplary quality indicators 316 include a quantity of satellites observed by the GPS receiver. In other embodiments, determining the quality indicators 316 includes exchanging data with a wireless access point.

While aspects of the disclosure may be described with reference to beacons 202 implementing protocols such as the 802.11 family of protocols, embodiments of the disclosure are operable with any beacon 202 for wireless communication. In the example of FIG. 1, the mobile device 102 detects the presence of beacons C1, C3, W1, W3, S1, S2, and S3.

Additionally, while aspects of the disclosure are described with reference to the mobile computing device 102, embodiments of the disclosure are operable with any computing device, as further described below.

Figure 2:
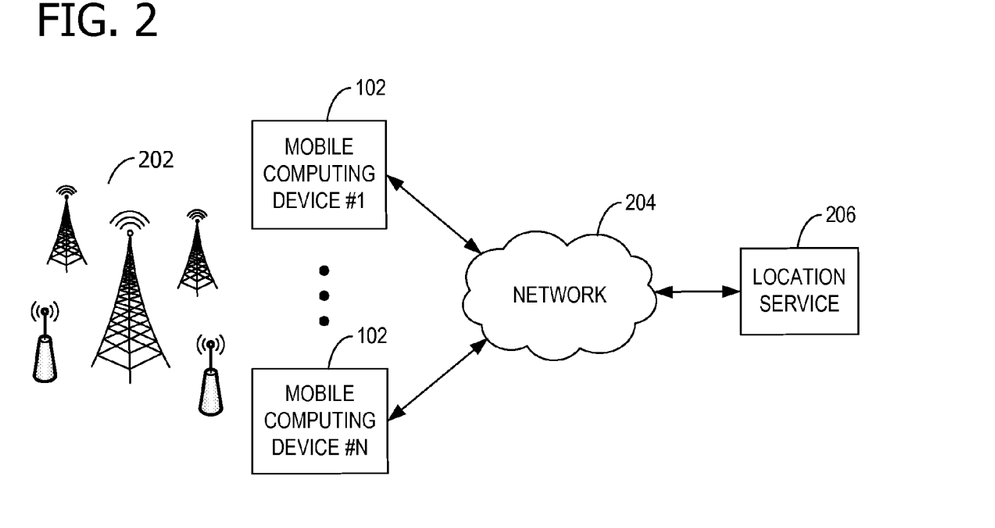
FIG. 2 is an exemplary block diagram illustrating a plurality of mobile computing devices providing crowd-sourced data to a cloud-based location service.

Referring next to FIG. 2, an exemplary block diagram illustrates a plurality of mobile computing devices 102 providing crowd-sourced data to a cloud-based location service 206. The plurality of mobile computing devices 102 include, for example, mobile computing device #1 through mobile computing device #N. In some embodiments, the mobile computing devices 102 include a mobile telephone, laptop, tablet, computing pad, netbook, gaming device, and/or portable media player. The mobile computing devices 102 may also include less portable devices such as desktop personal computers, kiosks, and tabletop devices. Additionally, each of the mobile computing devices 102 may represent a group of processing units or other computing devices.

The mobile computing devices 102 observe or otherwise detect one or more beacons 202 or other cell sites. The beacons 202 represent network elements for connecting the mobile computing devices 102 to other computing devices and/or network elements. Exemplary beacons 202 include cellular towers, base stations, base transceiver stations, base station sites, and/or any other network elements supporting any quantity and type of communication modes. Aspects of the disclosure are operable with any beacon 202 supporting any quantity and type of wireless and/or wired communication modes including cellular division multiple access (CDMA), Global System for Mobile Communication (GSM), wireless fidelity (Wi-Fi), 4G/Wi-Max, and the like.

Each of the mobile computing devices 102 stores properties or dimensions for each of the observed beacons. In some embodiments, exemplary properties include a latitude, longitude, and altitude of the observing mobile computing device 102 (or other description of the location of the mobile computing device 102), and an observation time. Other exemplary properties are contemplated, however. For example, other exemplary properties include an access point name (APN), a destination device to which the mobile computing device 102 is connected or attempting to connect, a timing difference between when the GPS position is obtained and when a Wi-Fi scan is completed, and the quality indicators 316 such as signal strength 318.

The mobile computing devices 102 send the properties with the observed beacons to the location service 206 via a network 204. The network 204 includes any means for communication between the mobile computing devices 102 and the location service 206.

In some embodiments, the mobile computing devices 102 cannot determine a current position. The observed beacons 202 and associated properties then represent an unresolved beacon fingerprint 312 rather than one of the positioned observations 324. The mobile computing devices 102 send the unresolved beacon fingerprint 312 to the location service 206 as a request for a position. The location service 206 infers the position of the requesting mobile computing device 102 based on the fingerprint 312 and provides the inferred position to the mobile computing device 102, as described herein.

While described in the context of the location service 206 receiving and processing positioned observations 324 and fingerprints 312, aspects of the disclosure contemplate other entities receiving and/or processing the positioned observations 324. The entities include, for example, any cloud-based service, a server, and/or a peer device. The functionality of the location service 206, as described herein, may also be divided among one or more entities. For example, one entity may collect the positioned observations 324 into a storage area for subsequent processing by the location service 206. The positioned observations 324 may be processed as they are received (e.g., in real time), or may be stored for future processing (e.g., as a batch).

Figure 3:
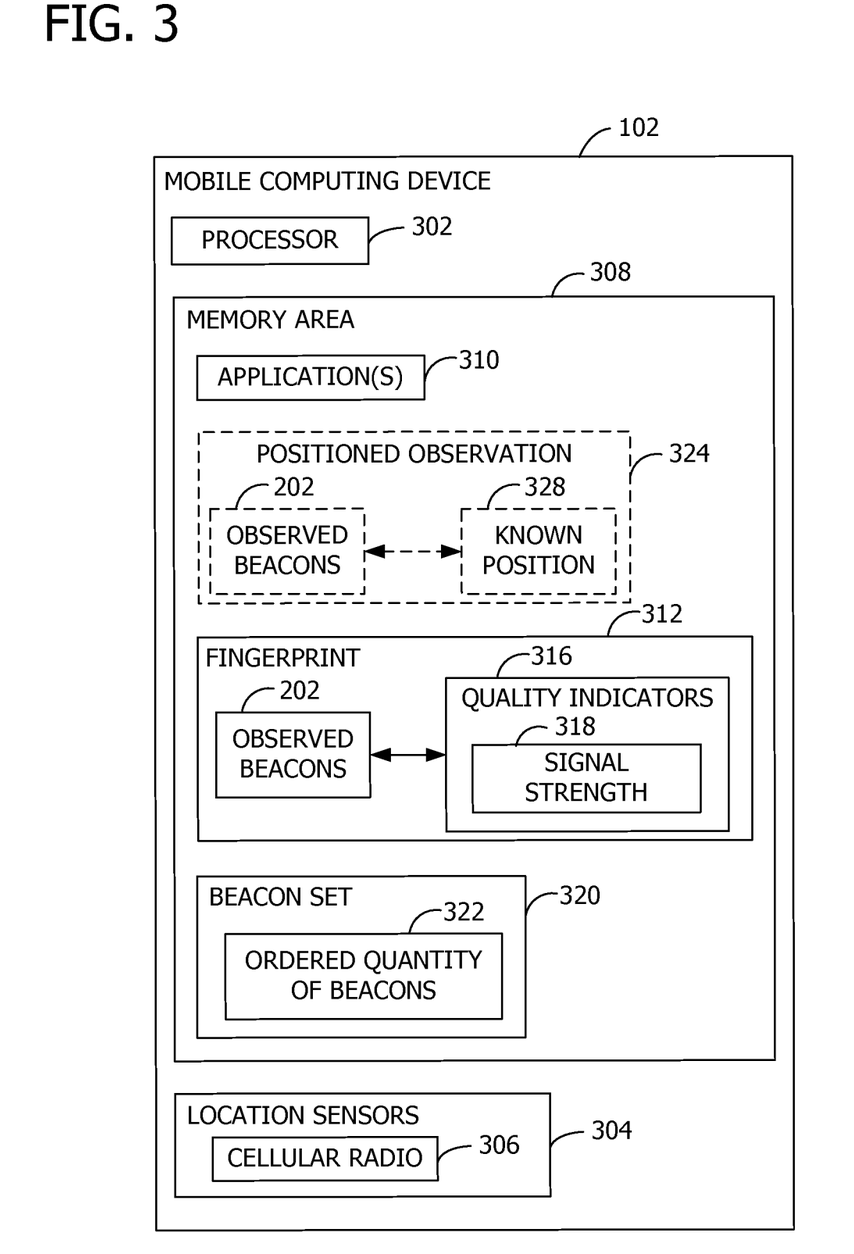
FIG. 3 is an exemplary block diagram illustrating a mobile computing device with a memory area storing positioned observations and fingerprints.

Referring next to FIG. 3, an exemplary block diagram illustrates the mobile computing device 102 with a memory area 308 storing positioned observations 324 and fingerprints 312. The mobile computing device 102 represents any device executing instructions (e.g., as application programs, operating system functionality, or both) to implement the operations and functionality associated with the mobile computing device 102. For example, the mobile computing device 102 may include any device executing instructions (e.g., application programs) to provide data including detected beacons 202. The mobile computing device 102 may be enabled with a GPS receiver such as part of assisted GPS, a radio such as in a wireless fidelity (Wi-Fi) positioning system or a cellular-based positioning system or a BLUETOOTH brand communication system, a three-dimensional motion sensor, or other element as a location sensor 304.

The mobile computing device 102 has at least one processor 302, the memory area 308, and at least one location sensor 304 such as a cellular radio 306. The processor 302 includes any quantity of processing units, and is programmed to execute computer-executable instructions for implementing aspects of the disclosure. The instructions may be performed by the processor 302 or by multiple processors executing within the mobile computing device 102, or performed by a processor external to the mobile computing device 102. In some embodiments, the processor 302 is programmed to execute instructions such as those illustrated in the figures (e.g., FIG. 5 and FIG. 6).

The mobile computing device 102 further has one or more computer readable media such as the memory area 308. The memory area 308 includes any quantity of media associated with or accessible by the mobile computing device 102. The memory area 308 may be internal to the mobile computing device 102 (as shown in FIG. 3), external to the computing device (not shown), or both (not shown).

The memory area 308 stores, among other data, one or more applications 310. The applications 310, when executed by the processor 302, operate to perform functionality on the mobile computing device 102. Exemplary applications 310 include mail application programs, web browsers, calendar application programs, address book application programs, messaging programs, media applications, location-based services, search programs, and the like. The applications 310 may communicate with counterpart applications or services such as web services accessible via a network such as network 204. For example, the applications 310 may represent downloaded client-side applications that correspond to server-side services executing in a cloud.

The memory area 308 further stores beacon sets 320 each representing a selected and ordered quantity 322 of the observed beacons 202 from the beacon fingerprints 312. The beacon set 320 is used to infer location, as described below with reference to FIG. 5 and FIG. 6.

The memory area 308 further stores one or more positioned observations 324 made by the mobile computing device 102. Each of the positioned observations 324 includes a set of observed beacons 202 along with a known position 328 of the mobile computing device 102 during the observation. For example, the known position 328 may be determined via a GPS receiver associated with the mobile computing device 102. The positioned observations 324 are used for developing a correspondence between beacon sets 320 and positions 414, as described below with reference to FIG. 5.

The memory area 308 further stores one or more beacon fingerprints 312. Each of the beacon fingerprints 312 identifies one or more observed beacons 202, and includes quality indicators 316 or other properties of each of the observed beacons 202. An exemplary quality indicator includes the received signal strength 318 (e.g., an absolute signal strength).

The mobile computing device 102 has one or more location sensors 304 associated therewith. The location sensors 304 may be internal and/or external to the mobile computing device 102. Exemplary location sensors 304 include, but are not limited to, a GPS receiver, a Wi-Fi adapter, a BLUETOOTH brand communication service element, or the like.

Figure 4:
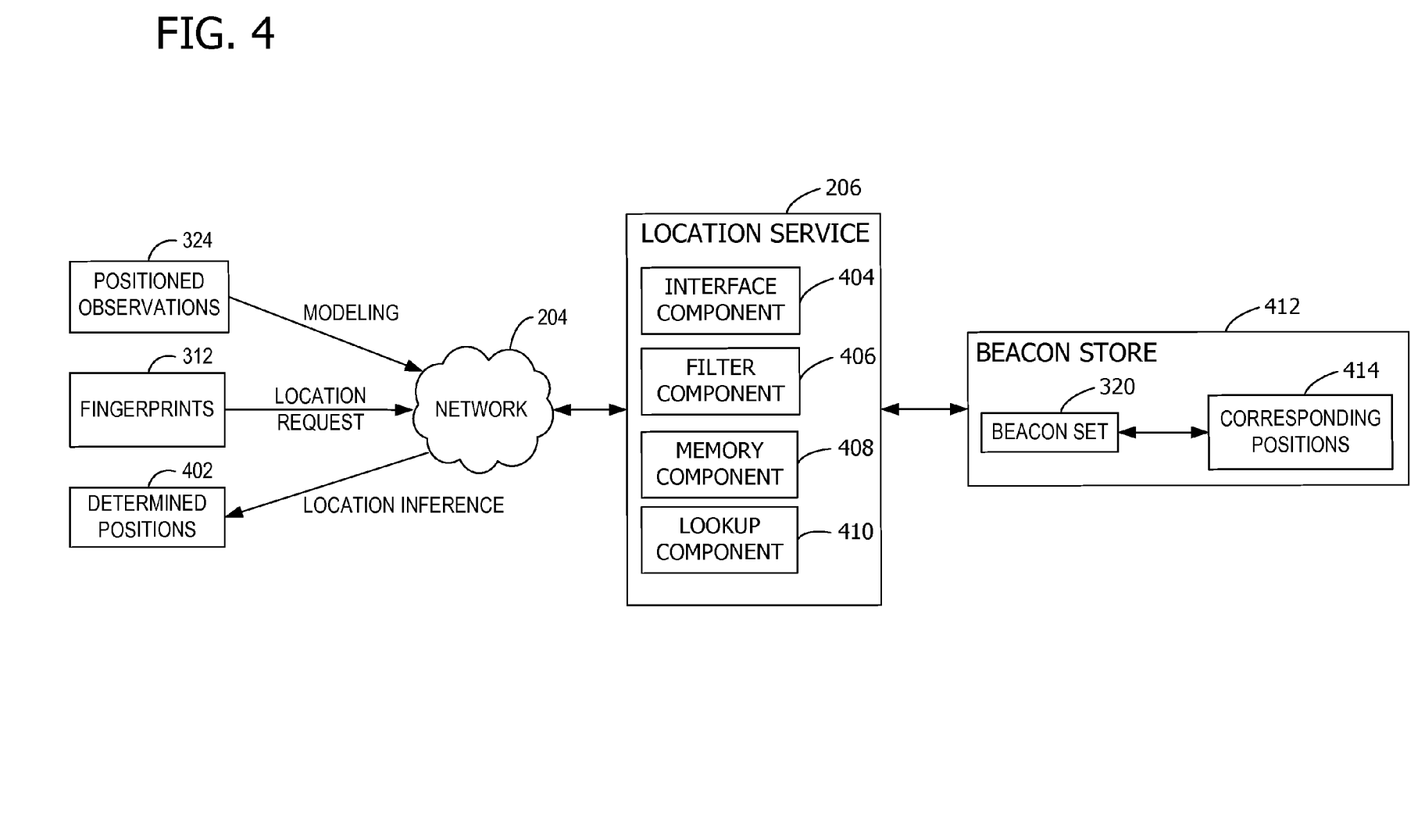
FIG. 4 is an exemplary diagram illustrating a location service receiving positioned observations for modeling and accessing a beacon store to provide location inferences based on unresolved fingerprints.

Referring next to FIG. 4, an exemplary diagram illustrates the location service 206 receiving positioned observations 324 for modeling and accessing a beacon store 412 to provide location inferences based on unresolved fingerprints 312. In the example of FIG. 4, the location service 206 crowd-sources data from a plurality of computing devices. For example, the location service 206 receives the positioned observations 324 from one or more computing devices such as mobile computing device 102 via the network 204. The location service 206 uses the positioned observations 324 to create correspondences between the beacon sets 320 and positions 414. The correspondences are stored in the beacon store 412.

The location service 206 receives location requests from computing devices such as mobile computing device 102. The location requests include unresolved fingerprints 312 (e.g., observed beacons 202). Based on the correspondences stored in the beacon store 412, the location service 206 identifies the position 414 corresponding to the beacon set 320 derived from the unresolved fingerprint 312. The identified position is provided to the requesting computing device, and represents the determined position 402 of the requesting computing device.

In some embodiments, the location service 206 includes, or has access to, computer storage media embodying one or more computer-executable components. Exemplary components include an interface component 404, a filter component 406, a memory component 408, and a lookup component 410. The interface component 404, when executed by a processor associated with the location service 206, causes the processor to receive at least one of the fingerprints 312 from at least one of the computing devices. The fingerprint 312 identifies beacons 202 observed by the computing device and a signal strength 318 for each of the observed beacons 202. The filter component 406, when executed by a processor associated with the location service 206, causes the processor to define, based on the signal strength 318, an ordered beacon set 320 including a plurality of the beacons 202 ordered according to the signal strength 318. The filter component 406 defines the ordered beacon set 320 by selecting a pre-defined quantity 322 of beacons 202 having the highest signal strength 318 relative among the beacons 202. For example, the filter component 406 selects three beacons 202 having the strongest signal strength 318. In general, a strong or high signal strength 318 indicates a close proximity of the beacon 202 to the observing computing device, relative to the other observed beacons 202.

The memory component 408, when executed by a processor associated with the location service 206, causes the processor to access a memory area (e.g., the beacon store 412) storing a correspondence between ordered beacon sets 320 and positions 414. For example, the memory component 408 creates a table to store the correspondence between the ordered beacon sets 320 and the positions 414. Because the position information in the positioned observations 324 may differ even though the corresponding ordered beacon sets 320 may be the same, the table created and maintained by the memory component 408 may have a plurality of positions 414 associated with a single ordered beacon set 320. In such embodiments, the location service 206 may perform a refining operation for each ordered beacon set 320 to calculate a single position associated with each ordered beacon set 320. The calculation may be performed as each new positioned observation 324 is received, or may be performed periodically (e.g., nightly).

The beacon store 412 may additionally store other position information relevant to location determination. In some embodiments, aspects of the disclosure contemplate the operations described herein as supplementing other location determination algorithms.

The lookup component 410, when executed by a processor associated with the location service 206, causes the processor to identify the position 414 associated with the ordered beacon set 320 defined by the filter component 406. The lookup component 410 identifies the position 414 based on the correspondence stored by the memory component 408 in the memory area. The interface component 404 provides the position 414 to the computing device as an inferred location of the computing device.

Figure 5:
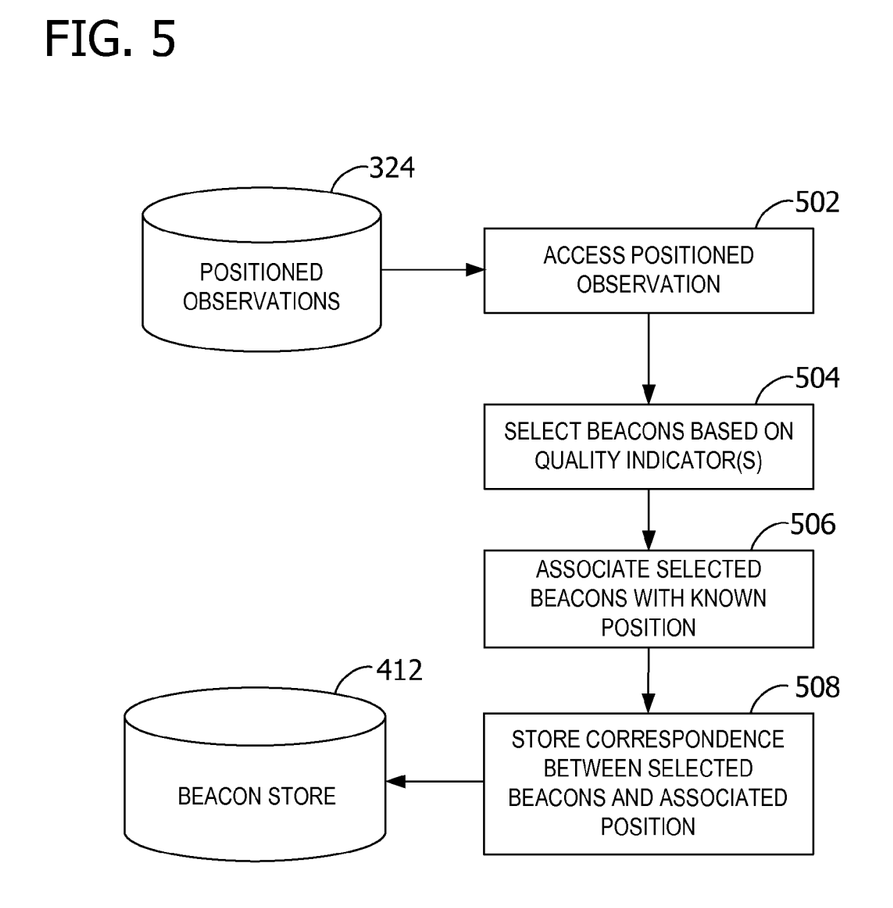
FIG. 5 is an exemplary flow chart illustrating operation of a computing device to associate beacon sets with corresponding positions.
Figure 6:
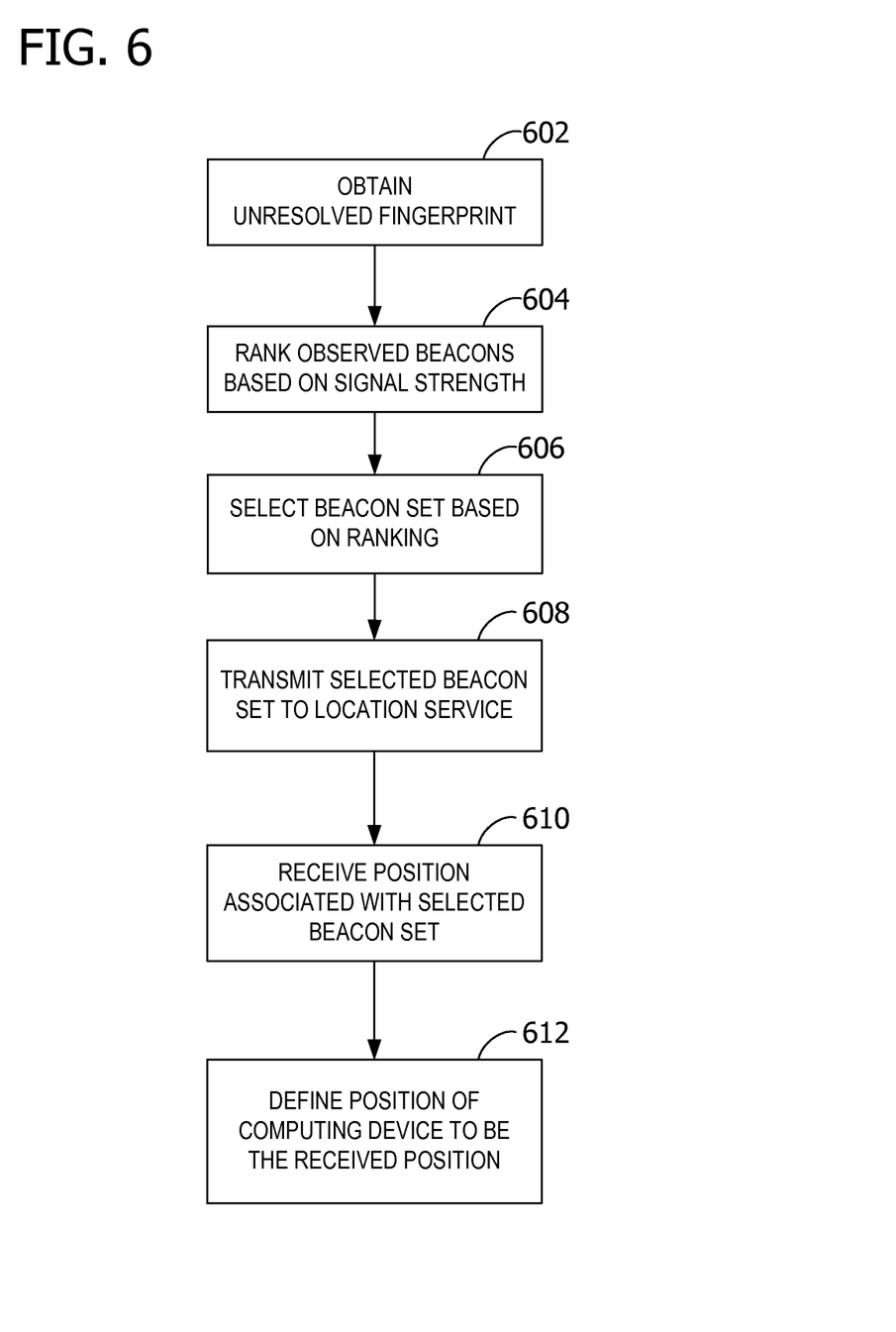
FIG. 6 is an exemplary flow chart illustrating operation of a computing device to determine a position associated with an unresolved fingerprint using a set of beacons ranked based on signal strength.

Referring next to FIG. 5, an exemplary flow chart illustrates operation of the computing device to associate beacon sets 320 with corresponding positions 414. The exemplary operations illustrated in FIG. 5 represent modeling, while the operations illustrated in FIG. 6 represent location inference based on the modeling.

The operations illustrated in FIG. 5 may be performed by any computing device. In some embodiments, the operations are performed by each of the mobile computing devices 102 or other devices equipped with one or more of the location sensors 304. In such embodiments, each of the mobile computing devices 102 maintains the beacon store 412 locally, and may provide or synchronize the beacon store 412 with another device such as the location service 206 or other cloud service. In other embodiments, the operations are performed by the location service 206. In such embodiments, the location service 206 collects the positioned observations 324 from a plurality of the mobile computing devices 102 and maintains a global or centralized beacon store 412 (e.g., as shown in FIG. 4).

At 502, the computing device accesses one or more of the positioned observations 324. In some embodiments, accessing the positioned observations 324 includes receiving, from the mobile computing device 102, the known position 328 of the mobile computing device 102 (e.g., via GPS or other location system), a set of beacons 202 observed by the mobile computing device 102, and one or more quality indicators 316. The position 328, set of beacons 202, and quality indicators 316 constitute a record representing crowd-sourced data obtained or generated by the mobile computing device 102.

In embodiments in which the computing device is the mobile computing device 102 or other device equipped with location sensors 304, the positioned observations 324 are generated by the mobile computing device 102 (e.g., the mobile computing device 102 observes the beacons 202). The mobile computing device 102 also determines the quality indicators 316, and determines the position 328 of the mobile computing device 102 (e.g., via a satellite-based location system such as GPS). Alternatively or in addition, the mobile computing device 102 receives the positioned observations 324 from the location service 206 or from other devices (e.g., peer-to-peer devices) to create a local beacon store 412.

At 504, the computing device selects a plurality of the beacons 202 based on the quality indicators 316 relative among the beacons 202. For example, the quality indicators 316 may include a signal strength 318 such as an absolute signal strength. The computing device compares the signal strength 318 of each of the observed beacons 202 to create the relative signal strength that is used to identify beacons 202 with the strongest or highest signal strength. These identified beacons 202 define the selected beacons 202, and may represent a subset of the observed beacons 202. The computing device orders or otherwise ranks the identified beacons 202, such as in decreasing order of signal quality (e.g., signal strength 318). Alternatively or in addition, the computing device filters out or otherwise eliminates the beacons 202 with weak signal strength 318 to leave only the beacons 202 with strong signal strength 318. In some embodiments, a pre-defined quantity 322 of the beacons 202 is selected. For example, the top three beacons 202 having the strongest signal strength 318 may be selected.

In other embodiments, the computing device selects the beacons 202 based on other elements of the quality indicators 316. For example, the computing device may select the beacons 202 based on an error radius associated with the positioned observation 324, and/or a quantity of previously received observations 324 including each beacon 202 (e.g., sample size).

At 506, the computing device links, corresponds, or otherwise associates the position 328 with the selected beacons 202 (e.g., creating position 414 in FIG. 3).

At 508, the computing device stores the correspondence between the position 414 and the selected beacons 202 in memory. For example, the computing device may store the correspondence as entries in a lookup table in the beacon store 412. In embodiments in which the computing device is the location service 206, the location service 206 stores, in the beacon store 412, correspondences derived from positioned observations 324 obtained from a plurality of the mobile computing devices 102.

Referring next to FIG. 6, an exemplary flow chart illustrates operation of the computing device to determine a position associated with an unresolved fingerprint 312 using a set of beacons 202 ranked based on signal strength 318. While the operations illustrated in FIG. 6 are described with reference to signal strength 318, aspects of the disclosure contemplate ranking the beacons 202 based on any of the quality indicators 316 (e.g., error radius, frequency of observation of each beacon 202, etc.). The operations illustrated in FIG. 6 may be performed by the mobile computing device 102 or any other device requesting position information based on observed beacons 202.

At 602, the mobile computing device 102 obtains, generates, or otherwise receives an unresolved fingerprint 312. The fingerprint 312 includes beacons 202 observed by the mobile computing device 102. The fingerprint 312 includes the received signal strength 318 associated with the observed beacons 202, but does not include position information describing the position 328 of the observing computing device.

At 604, the mobile computing device 102 ranks the observed beacons 202 in the obtained fingerprint 312 based on the received signal strength 318 of each of the observed beacons 202. At 606, the mobile computing device 102 selects or otherwise defines a beacon set 320 based on the beacon ranking. The beacon set 320 includes an ordered plurality of the beacons 202 from the fingerprint 312. In some embodiments, the beacon set 320 includes a pre-defined quantity 322 of beacons 202 ordered according to the received signal strength 318. For example, the beacon set 320 includes three beacons 202 having the strongest received signal strength 318 relative among the beacons 202 in the fingerprint 312. Alternatively or in addition, the mobile computing device 102 eliminates beacons 202 from the beacon set 320 that have a low signal strength 318 relative to the other observed beacons 202 in the fingerprint 312.

At 608, the mobile computing device 102 sends or transmits the beacon set 320 to the location service 206 (e.g., via the network 204). The location service 206 accesses the beacon store 412 to identify one of the positions 414 that corresponds to the beacon set 320. For example, the beacon set 320 is used as an index into a table to obtain the corresponding position 414. In embodiments in which the beacon store 412 has a plurality of positions associated with the beacon set 320 (e.g., derived from positioned observations 324 from a plurality of mobile computing device 102), the location service 206 may calculate a single position based on the plurality of positions. Aspects of the disclosure are operable with any location refining algorithm that calculates a single position from a plurality of positions.

At 610, the mobile computing device 102 receives, from the location service 206, the position 414 determined by the location service 206 to correspond to the beacon set 320. At 612, the mobile computing device 102 defines its position to be the determined position 402 received from the location service 206.

Figure 7:
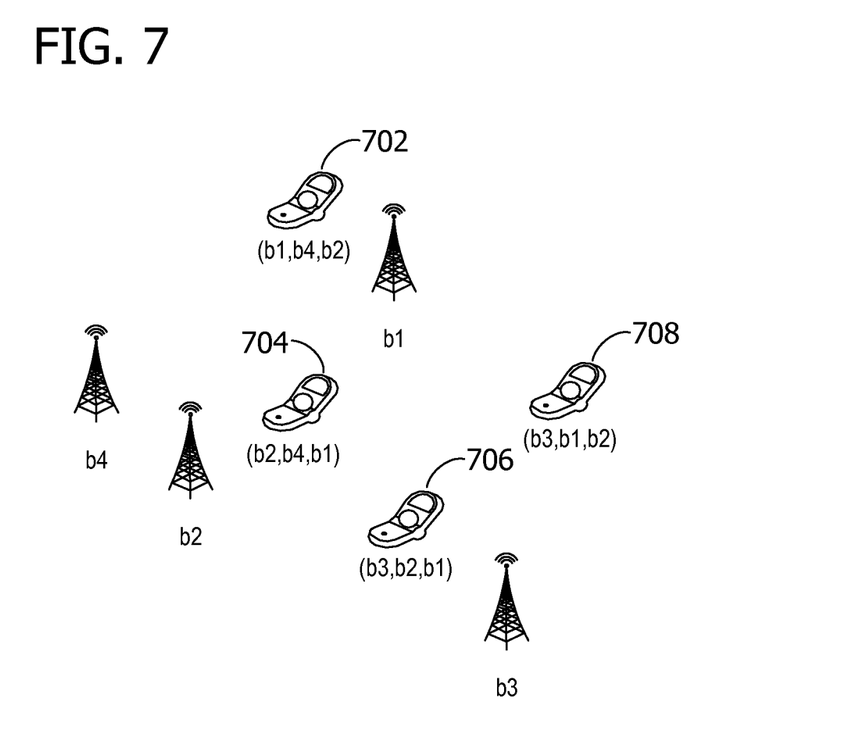
FIG. 7 is an exemplary block diagram illustrating four mobile computing devices observing a plurality of beacons and ordering the observed beacons based on relative signal strength.

Referring next to FIG. 7, an exemplary block diagram illustrates four mobile computing devices observing a plurality of beacons and ordering the observed beacons based on relative signal strength. In the example of FIG. 7, there are four beacons (b1, b2, b3, and b4) and four mobile computing devices 702, 704, 706, 708.

Each of the devices 702, 704, 706, 708 observes each of the four beacons, but has ranked each of the observed beacons based on relative signal strength. For example, device 702 observed and ranked the beacons with the result that beacon b1, beacon b4, and beacon b2 had the strongest signal strength 318, in that order. Device 704 observed and ranked the beacons with the result that beacon b2, beacon b4, and beacon b1 had the strongest signal strength 318, in that order. Device 706 observed and ranked the beacons with the result that beacon b3, beacon b2, and beacon b1 had the strongest signal strength 318, in that order. Device 708 observed and ranked the beacons with the result that beacon b3, beacon b1, and beacon b2 had the strongest signal strength 318, in that order.

Additional Examples

A greater quantity of positioned observations 324 for a particular spatial region improves accuracy of location inference for that region. In some embodiments, the location service 206 determines that the mobile computing devices 102 have not provided enough positioned observations 324 (e.g., rural areas). In such embodiments, the location service 206 may generate additional positioned observations 324 by generating permutations of the ordered beacon sets 320 (e.g., ordered plurality of beacons 202) and associating the same position 328 with each of the permutations. Each of the permutations and the position 328 are stored as additional entries in the beacon store 412.

At least a portion of the functionality of the various elements illustrated in the figures may be performed by other elements in the figures, or entities (e.g., processor, web service, server, application program, computing device, etc.) not shown in the figures.

In some embodiments, the operations illustrated in FIG. 5 and FIG. 6 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer readable storage media and communication media. Computer readable storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for inferring location using a beacon set 320 selected based on the received signal strength indicators, and exemplary means for creating the beacon store 412 correlating positions 414 with beacon sets 320 each including a plurality of beacons 202 ordered by signal strength 318.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for inferring location using a beacon set selected based on signal strength, said system comprising:
   a memory area associated with a computing device, said memory area storing at least one fingerprint having associated therewith beacons observed by the computing device, said memory area further storing a received signal strength indicator for each of the observed beacons; and
   a processor programmed to:
      rank the beacons based on the received signal strength indicators;
      select, based on the beacon ranking, a beacon set including an ordered plurality of the beacons from the fingerprint stored in the memory area, said ordered plurality of the beacons having a high received signal strength indicator relative among the beacons;
      transmit the selected beacon set to a location service via a network, said location service identifying a position associated with the selected beacon set based on a correspondence between positions and beacon sets derived from other computing devices;

receive, from the location service, the identified position associated with the transmitted beacon set; and define a position of the computing device to be the received, identified position.

2. The system of claim 1, wherein the processor ranks the beacons by eliminating beacons with low received signal strength indicators relative among the beacons.

3. The system of claim 1, wherein the selected beacon set represents a spatial region defined by the beacons associated with the selected beacon set, and wherein the received, identified position represents a centroid of the spatial region.

4. The system of claim 1, wherein the selected beacon set represents a virtual beacon.

5. The system of claim 1, further comprising means for inferring location using the beacon set selected based on the received signal strength indicators.

6. The system of claim 1, further comprising means for creating a beacon store correlating positions with beacon sets each including a plurality of beacons ordered by signal strength.

7. A method comprising:

accessing a positioned observation associated with a computing device, said positioned observation having associated therewith beacons observed by the computing device, one or more quality indicators for each of the observed beacons, and a position of the computing device;

selecting a plurality of the beacons based on the quality indicators relative among the beacons;

associating the position with the selected plurality of the beacons; and storing the selected plurality of the beacons and associated position in a memory area, wherein said accessing, said selecting, said associating, and said storing are performed by the computing device or a cloud service.

8. The method of claim 7, wherein the selected beacons are ordered in a decreasing order of quality indicators.

9. The method of claim 7, wherein the quality indicators include relative signal strength, and wherein selecting the plurality of the beacons comprises ordering the beacons based on relative signal strength to identify beacons with strong relative signal strength.

10. The method of claim 7, wherein the quality indicators include relative signal strength, and wherein selecting the plurality of the beacons comprises filtering the beacons based on relative signal strength to eliminate beacons with weak relative signal strength.

11. The method of claim 7, wherein accessing the positioned observation comprises one or more of the following: receiving the positioned observation from a mobile computing device, observing the beacons, obtaining the positioned observation from a location service, determining the quality indicators associated with each of the beacons, and determining a position of the mobile computing device using a satellite-based location system.

12. The method of claim 7, wherein the cloud service is a location service.

13. The method of claim 7, wherein the quality indicators include relative signal strength, and wherein selecting the plurality of the beacons comprises selecting three beacons having the highest relative signal strength.

14. The method of claim 7, wherein accessing the positioned observation comprises accessing a plurality of positioned observations each associated with one of a plurality of computing devices, and further comprising:

identifying the accessed plurality of positioned observations having the selected plurality of the beacons associated therewith; and calculating the position of the selected plurality of the beacons based on the positions associated with the identified, accessed plurality of positioned observations.

15. The method of claim 7, wherein the selected plurality of the beacons and associated position are stored in the memory area as entries in a table, and further comprising:

generating permutations of the selected plurality of the beacons; and associating the position with the generated permutations to create additional entries in the table.

16. The method of claim 7, wherein selecting the plurality of the beacons comprises selecting a plurality of the beacons based on one or more of the following: error radius associated with each of the beacons, a relative signal strength associated with each of the beacons, and a quantity of observations associated with each of the beacons in a beacon store.

17. One or more computer storage media embodying computer-executable components, said components comprising:

an interface component that when executed causes at least one processor to receive a fingerprint from a computing device, said fingerprint having associated therewith beacons observed by the computing device and a signal strength for each of the observed beacons;

a filter component that when executed causes at least one processor to define, based on the signal strength, an ordered beacon set including a plurality of the beacons ordered according to the signal strength;

a memory component that when executed causes at least one processor to access a memory area storing a correspondence between ordered beacon sets and positions; and a lookup component that when executed causes at least one processor to identify a position associated with the defined, ordered beacon set based on the correspondence stored by the memory component in the memory area, wherein the interface component provides the position to the computing device as an inferred location of the computing device.

18. The computer storage media of claim 17, wherein the filter component defines the ordered beacon set by selecting a pre-defined quantity of beacons having a high signal strength relative among the beacons.

19. The computer storage media of claim 17, wherein the memory component creates a table to store the correspondence between the ordered beacon sets and the positions.

20. The computer storage media of claim 17, wherein the interface component, the filter component, the memory component, and the lookup component are associated with a location service that crowd-sources data from a plurality of mobile computing devices.

* * * * *